US010535307B2

(12) United States Patent
Liang et al.

(10) Patent No.: US 10,535,307 B2
(45) Date of Patent: Jan. 14, 2020

(54) METHOD AND DEVICE FOR DRIVING ORGANIC LIGHT EMITTING DIODE DISPLAY DEVICE THAT INCLUDES ACQUIRING EACH CURRENT FLOWING THROUGH EACH ORGANIC LIGHT EMITTING DIODE ACCORDING TO A VIDEO SIGNAL

(71) Applicant: Shenzhen China Star Optoelectronics Semiconductor Display Technology Co., Ltd., Shenzhen (CN)

(72) Inventors: Pengfei Liang, Shenzhen (CN); Taijiun Hwang, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/578,716

(22) PCT Filed: Nov. 30, 2017

(86) PCT No.: PCT/CN2017/113689
§ 371 (c)(1),
(2) Date: Dec. 1, 2017

(87) PCT Pub. No.: WO2019/033612
PCT Pub. Date: Feb. 21, 2019

(65) Prior Publication Data

US 2019/0057655 A1 Feb. 21, 2019

(30) Foreign Application Priority Data

Aug. 17, 2017 (CN) .......................... 2017 1 0704916

(51) Int. Cl.
*G06F 3/038* (2013.01)
*G09G 5/00* (2006.01)
(Continued)

(52) U.S. Cl.
CPC ......... *G09G 3/3258* (2013.01); *G09G 3/3233* (2013.01); *G09G 2300/0842* (2013.01);
(Continued)

(58) Field of Classification Search
None
See application file for complete search history.

(56) References Cited

U.S. PATENT DOCUMENTS

2006/0208975 A1 9/2006 Ono
2009/0195484 A1* 8/2009 Lee ...................... G09G 3/3216 345/76
(Continued)

FOREIGN PATENT DOCUMENTS

CN 1680988 A 10/2005
CN 103021335 A 4/2013
(Continued)

*Primary Examiner* — Lunyi Lao
*Assistant Examiner* — Kirk W Hermann
(74) *Attorney, Agent, or Firm* — Mark M. Friedman

(57) ABSTRACT

A method and a device for driving an organic light emitting diode display device are provided. The method includes acquiring an equivalent voltage of pixels between a cathode and an input of a negative voltage of a power source according to a video signal; calculating a current voltage of a gate of a driving thin film transistor in a light emitting stage according to the equivalent voltage; and controlling a voltage value of a positive voltage of the power source according to the current voltage of the gate of the driving thin film transistor, so as to reduce power consumption of the organic light emitting diode display device.

2 Claims, 4 Drawing Sheets

(51) Int. Cl.
*G09G 3/3258* (2016.01)
*G09G 3/3233* (2016.01)

(52) U.S. Cl.
CPC ............... *G09G 2320/0295* (2013.01); *G09G 2330/021* (2013.01); *G09G 2360/16* (2013.01)

(56) References Cited

U.S. PATENT DOCUMENTS

| | | | | |
|---|---|---|---|---|
| 2013/0293600 | A1 | 11/2013 | Lee et al. | |
| 2013/0342519 | A1* | 12/2013 | Kim | G09G 3/3225 345/211 |
| 2014/0240305 | A1* | 8/2014 | Chae | G09G 3/3225 345/212 |
| 2015/0049070 | A1 | 2/2015 | Ren et al. | |
| 2017/0076671 | A1 | 3/2017 | Kim et al. | |
| 2018/0211591 | A1 | 7/2018 | Chen | |

FOREIGN PATENT DOCUMENTS

| | | | |
|---|---|---|---|
| CN | 103383833 | A | 11/2013 |
| CN | 103559860 | A | 2/2014 |
| CN | 105845086 | A | 8/2016 |

* cited by examiner

METHOD AND DEVICE FOR DRIVING ORGANIC LIGHT EMITTING DIODE DISPLAY DEVICE THAT INCLUDES ACQUIRING EACH CURRENT FLOWING THROUGH EACH ORGANIC LIGHT EMITTING DIODE ACCORDING TO A VIDEO SIGNAL

BACKGROUND

Field

The present disclosure relates to a technological field of displays, and more particularly to a method and a device for driving an organic light emitting diode display device.

Background

Organic light emitting diode (OLED) display panels are self-luminous and flexible and have high brightness, a wide viewing angle, a high contrast ratio, and low power consumption. Accordingly, they are widely used in products such as screens of mobile phones, display devices of computers, and full color televisions.

As shown in FIG. 1, a conventional AMOLED pixel driving circuit includes a first thin film transistor T1, a second thin film transistor T2, a third thin film transistor T3, capacitors C1 and C2, and an organic light emitting diode D1. The capacitor C1 is a storage capacitor. In detail, a scanning signal Scan is inputted to a gate of the second thin film transistor T2. A data signal Data is inputted to a source of the second thin film transistor T2. A drain of the second thin film transistor T2 is electrically coupled to a gate of the first thin film transistor T1. A positive voltage OVDD of a power source is inputted to a source of the first thin film transistor T1. A drain of the first thin film transistor T1 is electrically coupled to an anode of the organic light emitting diode D1. A negative voltage OVSS of the power source is inputted to a cathode of the light emitting diode D1. One terminal of the capacitor C1 is electrically coupled to the gate of the first thin film transistor T1, and the other terminal of the capacitor C1 is electrically coupled to the drain of the first thin film transistor T1. One terminal of the capacitor C2 is electrically coupled to the anode of the organic light emitting diode D1, and the other terminal of the capacitor C2 is electrically coupled to the cathode of the organic light emitting diode D1. An initial signal Sen is inputted to a gate of the third thin film transistor T3. A reference voltage Vref is inputted to a source of the third thin film transistor T3. A drain of the third thin film transistor T3 is electrically coupled to the drain of the first thin film transistor T1.

FIG. 2 illustrates a timing diagram of the pixel driving circuit in FIG. 1. In stage T1 (i.e., a program stage), since the scanning signal Scan and the initial signal Sen are at a high level, the second thin film transistor T2 and the third thin film transistor T3 are turned on. A voltage Vg of the gate of the first thin film transistor T1 and a voltage Vs of the source are respectively equal to Vdata and Vref. For example, the voltage Vg in a first row Line1 of pixels is equal to Vdata0. The voltage Vg in a second row Line2 of pixels is equal to Vdata1. Accordingly, a cross voltage Vgs is generated in the program stage. Since Vref is smaller than a turn-on voltage of the organic light emitting diode D1, an OLED does not emit light in the program stage. When the scanning signal Scan and the initial signal Sen are at a low level, the voltage Vs is raised, and stage T2 (i.e., a light emitting stage) is entered.

In the light emitting stage, power consumption of an image is equal to OVDD*Ids. Ids is a current flowing through the OLED.

As shown in FIG. 3, since the cathode of the organic light emitting diode D1 has an entire layer structure, an equivalent resistance R is formed at the cathode in each pixel corresponding to different positions. As such, the voltage Vg is raised in the light emitting stage. A voltage Vg' of gate of the first thin film transistor T1 in the light emitting stage is:

$$Vg'=Vgs+Ids*R+Voled.$$

Voled is a voltage of the organic light emitting diode D1. The positive voltage OVDD of the power source is relevant to the voltage Vg, and increased ranges of the voltage Vg in different frames of images are different. Accordingly, when the positive voltage OVDD of the power source inputted to the different frames of images is fixed, power consumption of a display device is large.

Consequently, there is a need to provide a method and a device for driving an organic light emitting diode display device to solve the above-mentioned problems in the prior art.

SUMMARY OF THE DISCLOSURE

An objective of the present disclosure is to provide a method and a device for driving an organic light emitting diode display device which can reduce power consumption of the organic light emitting diode display device.

To solve the above-mentioned problems, the present disclosure provides a method for driving an organic light emitting diode display device. The organic light emitting diode display device includes a cathode. A positive voltage of a power source and a negative voltage of the power source are inputted to the organic light emitting diode display device. The method includes:

Acquiring each current flowing through each of organic light emitting diodes according to a video signal;

Calculating an equivalent voltage of pixels between the cathode and an input of the negative voltage of the power source according to each of the currents flowing through each of the organic light emitting diodes;

Acquiring maximum values of voltages of the organic light emitting diodes, according to the video signal, to obtain a maximum voltage value;

Calculating a current voltage of a gate of a driving thin film transistor according to the equivalent voltage and the maximum voltage value; and Controlling a voltage value of the positive voltage of the power source according to the current voltage of the gate of the driving thin film transistor, so as to reduce power consumption of the organic light emitting diode display device.

In the method for driving the organic light emitting diode display device, calculating the equivalent voltage according to each of the currents flowing through each of the organic light emitting diodes includes:

Acquiring each equivalent resistance of the pixels between the cathode and the input of the negative voltage of the power source; and Acquiring the equivalent voltage according to each of the equivalent resistances and each of the currents of the organic light emitting diodes.

In the method for driving the organic light emitting diode display device, acquiring each of the currents flowing through each of the organic light emitting diodes according to the video signal includes:

Acquiring a histogram of the video signal to obtain gray level distribution information of a display image; and Acquiring each of the currents flowing through each of the organic light emitting diodes according to the gray level distribution information.

In the method for driving the organic light emitting diode display device, the current voltage Vg' of the gate of the driving thin film transistor is:

$$Vg'=Vgs+U2+U3+Vth,$$

Vgs is a voltage difference between the gate of the driving thin film transistor and a source of the driving thin film transistor, U2 is the equivalent voltage, U3 is the maximum voltage value, and Vth is a threshold voltage of the driving thin film transistor.

The present disclosure provides a method for driving an organic light emitting diode display device. The organic light emitting diode display device includes a cathode. A positive voltage of a power source and a negative voltage of the power source are inputted to the organic light emitting diode display device. The method includes:

Acquiring an equivalent voltage of pixels between the cathode and an input of the negative voltage of the power source according to a video signal;

Calculating a current voltage of a gate of a driving thin film transistor in a light emitting stage according to the equivalent voltage; and Controlling a voltage value of the positive voltage of the power source according to the current voltage of the gate of the driving thin film transistor, so as to reduce power consumption of the organic light emitting diode display device.

In the method for driving the organic light emitting diode display device, acquiring the equivalent voltage of the pixels between the cathode and the input of the negative voltage of the power source according to the video signal includes:

Acquiring each current flowing through each organic light emitting diode according to the video signal; and Calculating the equivalent voltage according to each of the currents flowing through each of the organic light emitting diodes.

In the method for driving the organic light emitting diode display device, calculating the equivalent voltage according to each of the currents flowing through each of the organic light emitting diodes includes:

Acquiring each equivalent resistance of the pixels between the cathode and the input of the negative voltage of the power source; and Acquiring the equivalent voltage according to each of the equivalent resistances and each of the currents of the organic light emitting diodes.

In the method for driving the organic light emitting diode display device, acquiring each of the currents flowing through each of the organic light emitting diodes according to the video signal includes:

Acquiring a histogram of the video signal to obtain gray level distribution information of a display image; and Acquiring each of the currents flowing through each of the organic light emitting diodes according to the gray level distribution information.

In the method for driving the organic light emitting diode display device, calculating the current voltage of the gate of the driving thin film transistor in the light emitting stage according to the equivalent voltage includes:

Acquiring maximum values of voltages of the organic light emitting diodes, according to the video signal, to obtain a maximum voltage value; and Calculating the current voltage of the gate of the driving thin film transistor according to the equivalent voltage and the maximum voltage value.

In the method for driving the organic light emitting diode display device, the current voltage Vg' of the gate of the driving thin film transistor is:

$$Vg'=Vgs+U2+U3+Vth,$$

Vgs is a voltage difference between the gate of the driving thin film transistor and a source of the driving thin film transistor, U2 is the equivalent voltage, U3 is the maximum voltage value, and Vth is a threshold voltage of the driving thin film transistor.

The present disclosure further provides a device for driving an organic light emitting diode display device. The organic light emitting diode display device includes a cathode. A positive voltage of a power source and a negative voltage of the power source are inputted to the organic light emitting diode display device. The device includes:

A first voltage acquiring module configured to acquire an equivalent voltage of pixels between the cathode and an input of the negative voltage of the power source according to a video signal;

A second voltage acquiring module configured to calculate a current voltage of a gate of a driving thin film transistor in a light emitting stage according to the equivalent voltage; and A control module configured to control a voltage value of the positive voltage of the power source according to the current voltage of the gate of the driving thin film transistor, so as to reduce power consumption of the organic light emitting diode display device.

In the device for driving the organic light emitting diode display device, the first voltage acquiring module is specifically configured to: acquire each current flowing through each of organic light emitting diodes according to the video signal; and calculate the equivalent voltage according to each of the currents flowing through each of the organic light emitting diodes.

In the device for driving the organic light emitting diode display device, the first voltage acquiring module is specifically configured to: acquire each equivalent resistances of the pixels between the cathode and the input of the negative voltage of the power source; and acquire the equivalent voltage according to each of the equivalent resistances and each of the currents of the organic light emitting diodes.

In the device for driving the organic light emitting diode display device, the first voltage acquiring module is specifically configured to: acquire a histogram of the video signal to obtain gray level distribution information of a display image; and acquire each of the currents flowing through each of the organic light emitting diodes according to the gray level distribution information.

In the device for driving the organic light emitting diode display device, the second voltage acquiring module is specifically configured to: acquire maximum values of voltages of the organic light emitting diodes, according to the video signal, to obtain a maximum voltage value; and calculate the current voltage of the gate of the driving thin film transistor according to the equivalent voltage and the maximum voltage value.

In the device for driving the organic light emitting diode display device, the current voltage Vg' of the gate of the driving thin film transistor is:

$$Vg'=Vgs+U2+U3+Vth,$$

Vgs is a voltage difference between the gate of the driving thin film transistor and a source of the driving thin film transistor, U2 is the equivalent voltage, U3 is the maximum voltage value, and Vth is a threshold voltage of the driving thin film transistor.

In the method and the device for driving the organic light emitting diode display device, the power consumption can be reduced by calculating the voltage of the gate of the driving thin film transistor in the light emitting stage in each frame of image, and controlling the positive voltage of the power source inputted to the organic light emitting diode display device according to the voltage of the gate of the driving thin film transistor.

DETAILED DESCRIPTION OF THE PREFERRED EMBODIMENTS

Figure 1:
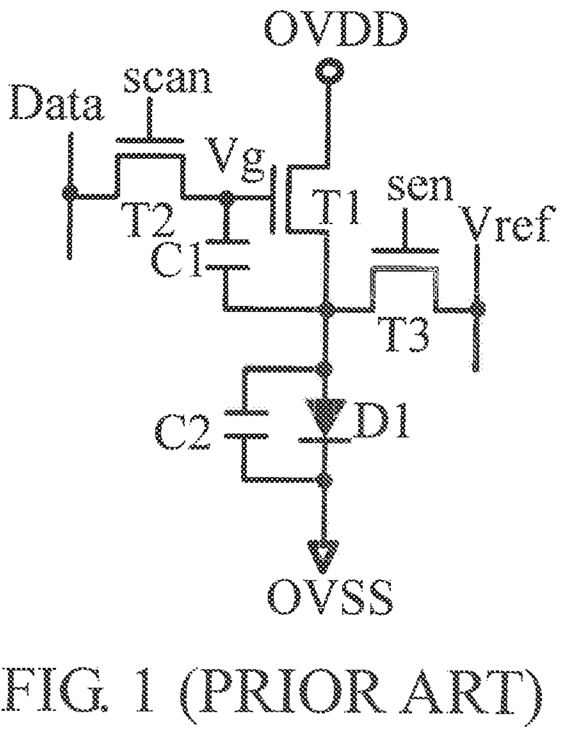
FIG. 1 (PRIOR ART)
FIG. 1 illustrates a circuit diagram of a conventional AMOLED pixel driving circuit.
Figure 2:
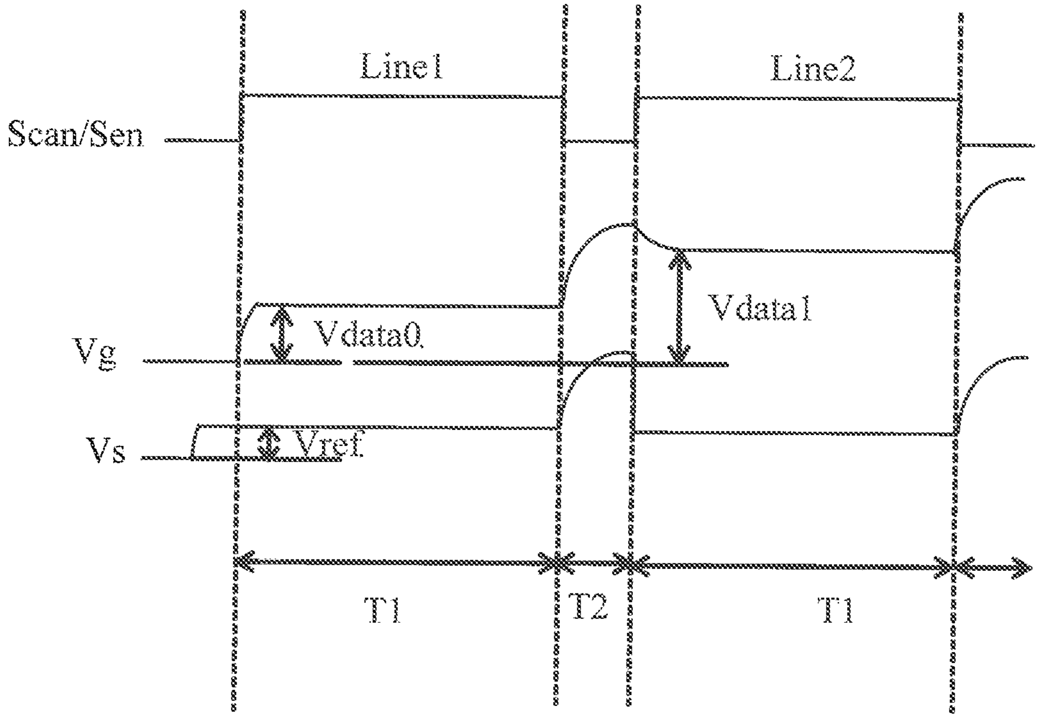
FIG. 2 (PRIOR ART)
FIG. 2 illustrates a timing diagram of the pixel driving circuit in FIG. 1.
Figure 3:
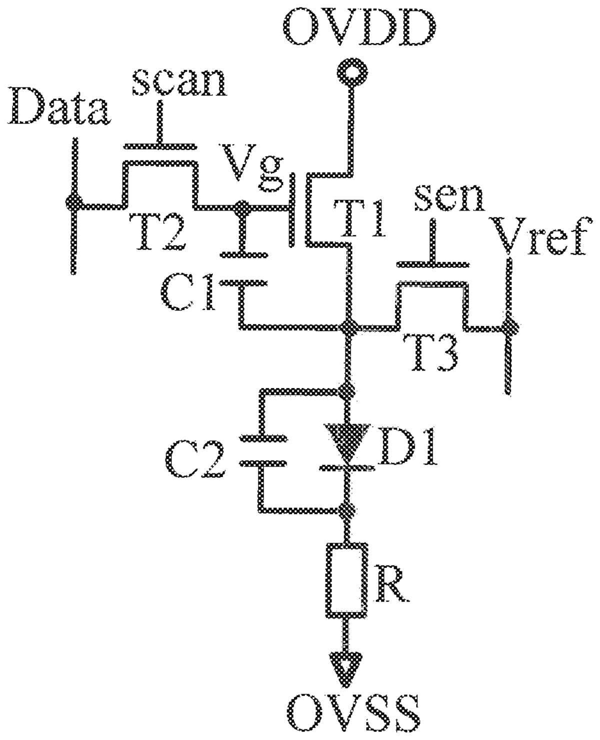
FIG. 3 (PRIOR ART)
FIG. 3 illustrates an equivalent circuit diagram in a light emitting stage of the conventional AMOLED pixel driving circuit.

The following embodiments are referring to the accompanying drawings for exemplifying specific implementable embodiments of the present disclosure. Furthermore, directional terms described by the present disclosure, such as upper, lower, front, back, left, right, inner, outer, side, etc., are only directions by referring to the accompanying drawings, and thus the used directional terms are used to describe and understand the present disclosure, but the present disclosure is not limited thereto. In the drawings, structure-like elements are labeled with like reference numerals.

An organic light emitting diode display device includes a cathode. A positive voltage OVDD of a power source and a negative voltage OVSS of the power source are inputted to the organic light emitting diode display device. A method for driving the organic light emitting diode display device of the present disclosure includes the following steps.

In step S101, an equivalent voltage of all pixels between the cathode and an input of the negative voltage of the power source is acquired according to an input video signal.

Figure 4:
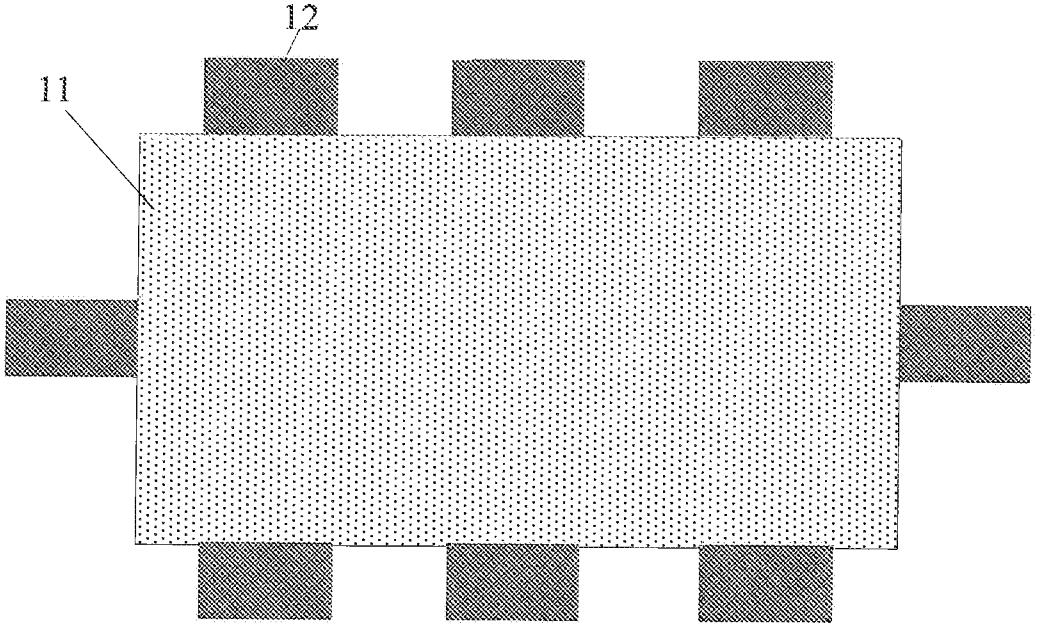
FIG. 4 illustrates a structure diagram of a cathode of an organic light emitting diode display device in accordance with the present disclosure.
Figure 5:
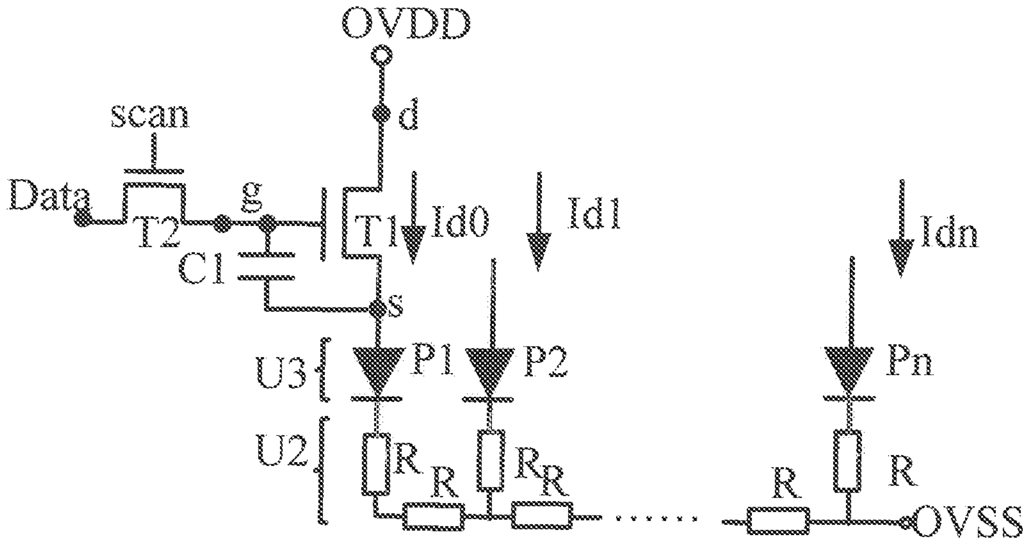
FIG. 5 illustrates an equivalent circuit diagram in a light emitting stage of an AMOLED pixel driving circuit in accordance with the present disclosure.

For example, as shown in FIG. 4 and FIG. 5, since the cathode 11 of the organic light emitting diode display device has an entire layer structure, an equivalent resistance of each of the pixels is formed between the cathode 11 and the input 12 of the negative voltage OVSS of the power source. As such, the equivalent voltage of each of the pixels exists between the cathode 11 and the input 12 of the negative voltage OVSS of the power source.

In detail, each of currents Id0-Idn flowing through each of organic light emitting diodes P1-Pn is acquired according to the video signal inputted to the organic light emitting diode display device (i.e., each frame of image). Then, the equivalent voltage is calculated according to each of the currents Id0-Idn of the organic light emitting diodes P1-Pn and corresponding resistances. The equivalent voltages is a voltage at the cathode 11 with respect to the input 12 of the negative voltage OVSS of the power source.

Acquiring the equivalent voltage of the pixels between the cathode and the input of the negative voltage of the power source according to the input video signal in step S101 includes the following steps.

In step S201, each of the currents flowing through each of the organic light emitting diodes is acquired according to the video signal.

For example, each of the currents Id0-Idn flowing through each of the organic light emitting diodes P1-Pn is acquired according to the video signal inputted to the organic light emitting diode display device.

Acquiring each of the currents flowing through each of the organic light emitting diodes according to the video signal in step S201 includes the following steps.

In step S2011, a histogram of the video signal is acquired to obtain gray level distribution information of a display image.

In step S2012, each of the currents flowing through each of the organic light emitting diodes is acquired according to the gray level distribution information.

For example, the histogram of the video signal is acquired. The histogram is used to show the gray level distribution information of the display image when the video signal is displayed. Then, each of the currents Id0-Idn flowing through each of the organic light emitting diodes is calculated according to the gray level distribution information.

In step S202, the equivalent voltage is calculated according to each of the currents flowing through each of the organic light emitting diodes.

In detail, step S202 may include the following steps.

In step S2021, each of the equivalent resistances of the pixels between the cathode and the input of the negative voltage of the power source is acquired.

In step S2022, the equivalent voltage is acquired according to each of the equivalent resistances and each of the currents of the organic light emitting diodes.

For example, each of the equivalent resistances R0-Rn of the pixels is formed between the cathode 11 and the input 12 of the negative voltage of the power source. It can be appreciated that the equivalent resistances R0-Rn have a normal distribution. In detail, the equivalent resistances R0, R1, and Rn are:

$$R0 = \sum_{1}^{n} R;$$

$$R1 = \sum_{1}^{n-1} R;$$

$$Rn = \sum_{1}^{1} R.$$

It can be appreciated that the equivalent resistances R2-Rn−1 are similar to the equivalent resistances R0, R1, and Rn.

A voltage of each of the pixels is acquired according to each of the currents of the organic light emitting diodes and the corresponding equivalent resistance. Then, the equivalent voltage is acquired by calculating a sum of the voltages of the pixels. The equivalent voltage U2 is:

$$U2=Id0*R0+Id1*R+\ldots+Idn*Rn.$$

In step S102, a current voltage of a gate of a driving thin film transistor in a light emitting stage is calculated according to the equivalent voltage.

For example, the current voltage Vg' of the gate of the driving thin film transistor T1 in the light emitting stage is calculated according to the equivalent voltage.

In detail, calculating the current voltage of the gate of the driving thin film transistor in the light emitting stage according to the equivalent voltage includes the following steps.

In step S1021, maximum values of voltages of all the organic light emitting diodes are acquired, according to the video signal, to obtain a maximum voltage value.

For example, a histogram analysis is performed on the display image according to the video signal, thereby acquiring a gray level distribution of the display image. The gray level distribution can correspondingly acquire a current distribution. The voltages of the organic light emitting diodes can be calculated by the current distribution. A maximum one of the voltages of the organic light emitting diodes is served as the maximum voltage value U3.

In step S1022, the current voltage of the gate of the driving thin film transistor is calculated according to the equivalent voltage and the maximum voltage value.

In detail, the current voltage Vg' of the gate of the driving thin film transistor is:

$$Vg'=Vgs+U2+U3+Vth.$$

Vgs is a voltage difference between the gate of the driving thin film transistor and a source. U2 is the equivalent voltage. U3 is the maximum voltage value. Vth is a threshold voltage of the driving thin film transistor.

In step S103, a voltage value of the positive voltage of the power source is controlled according to the current voltage of the gate of the driving thin film transistor, so as to reduce the power consumption of the organic light emitting diode display device.

The power consumption P of the organic light emitting diode display device is:

$$P=OVDD*Ids.$$

Accordingly, an objective of reducing the power consumption of the organic light emitting diode display device can be achieved by decreasing the positive voltage OVDD. Furthermore, since OVDD>Vg'+Vth, the positive voltage OVDD of the power source is relevant to the current voltage Vg' of the gate of the driving thin film transistor T1. That is, the positive voltage OVDD of the power source is greater than a sum of the current voltage Vg' of the gate of the driving thin film transistor T1 and the threshold voltage of the driving thin film transistor T1. Even if the driving thin film transistor T1 is in a saturation state, the positive voltage OVDD of the power source can be controlled according to each frame of image. That is, the power consumption of the organic light emitting diode display device can be reducing by decreasing the positive voltage OVDD of the power source.

Figure 6:
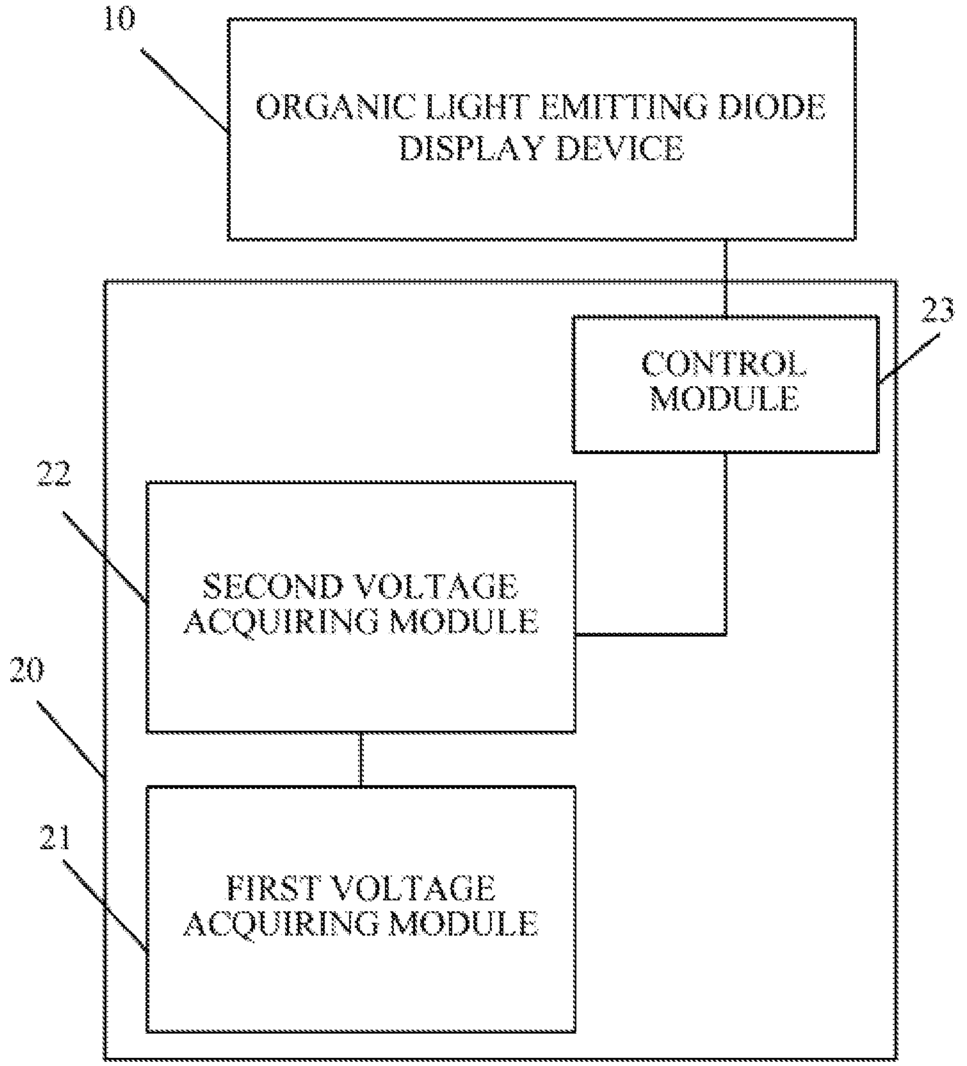
FIG. 6 illustrates a structure diagram of a device for driving an organic light emitting diode display device in accordance with the present disclosure.

The present disclosure further provides a device for driving an organic light emitting diode display device. As shown in FIG. 6, the device 20 is electrically coupled to the organic light emitting diode display device 10. The device 20 includes a first voltage acquiring module 21, a second voltage acquiring module 22, and a control module 23.

The first voltage acquiring module 21 is configured to acquire an equivalent voltage of all pixels between a cathode and an input of a negative voltage of a power source according to an input video signal. The video signal is inputted to the first voltage acquiring module 21.

The second voltage acquiring module 22 is configured to calculating a current voltage of a gate of a driving thin film transistor in a light emitting stage according to the equivalent voltage. That is, the second voltage acquiring module 22 is electrically coupled to the first voltage acquiring module 21. The second voltage acquiring module 22 may be further electrically coupled to a central control board. The central control board is electrically coupled to the organic light emitting diode display device 10.

The control module 23 is configured to control a voltage value of the positive voltage of the power source according to the current voltage of the gate of the driving thin film transistor, so as to reduce the power consumption of the organic light emitting diode display device 10. That is, the control module 23 outputs the positive voltage of the power source.

The first voltage acquiring module 21 is specifically configured to acquire each current flowing through each organic light emitting diode according to the video signal; and calculating the equivalent voltage according to each of the currents flowing through each of the organic light emitting diodes.

The first voltage acquiring module 21 is specifically configured to acquire each equivalent resistance of the pixels between the cathode and the input of the negative voltage of the power source; and acquire the equivalent voltage according to each of the equivalent resistances and each of the currents of the organic light emitting diodes.

The first voltage acquiring module 21 is specifically configured to acquire a histogram of the video signal to obtain gray level distribution information of a display image; and acquiring each of the currents flowing through each of the organic light emitting diodes according to the gray level distribution information.

The second voltage acquiring module 22 is specifically configured to acquire maximum values of voltages of all the organic light emitting diodes, according to the video signal, to obtain a maximum voltage value; and calculating the current voltage of the gate of the driving thin film transistor according to the equivalent voltage and the maximum voltage value.

In the method and the device for driving the organic light emitting diode display device, the power consumption can be reduced by calculating the voltage of the gate of the driving thin film transistor in the light emitting stage in each frame of image, and controlling the positive voltage of the power source inputted to the organic light emitting diode display device according to the voltage of the gate of the driving thin film transistor.

The above descriptions are merely the specific embodiments of the present disclosure, but the protection scope of the present disclosure is not limited thereto, anyone skilled who is familiar with this art could readily conceive variations or substitutions within the technical scope disclosed by the present disclosure, and these variations or substitutions shall be encompassed in the protection scope of the present disclosure. Thus, the protection scope of the present disclosure shall be subjected to the protection scope of the claims.

What is claimed is:

1. A method for driving an organic light emitting diode display device, wherein the organic light emitting diode display device comprises a cathode, and a positive voltage of a power source (OVDD) and a negative voltage of the power source are inputted to the organic light emitting diode display device, the method comprises:

acquiring each current flowing through each organic light emitting diode according to a video signal;

calculating an equivalent voltage of pixels between the cathode and an input of the negative voltage of the power source according to each of the currents flowing through each of the organic light emitting diodes;

acquiring maximum values of voltages of the organic light emitting diodes, according to the video signal, to obtain a maximum voltage value included in the maximum values of voltages of the organic light emitting diodes;

calculating a current voltage of a gate of a driving thin film transistor according to the equivalent voltage and the maximum voltage value included in the maximum values of voltages of the organic light emitting diodes; and controlling a voltage value of the positive voltage of the power source (OVDD) according to the current voltage of the gate of the driving thin film transistor so that the positive voltage of the power source (OVDD) is reduced to a lowest level while meeting the condition that OVDD>Vq'+Vth, in which Vq' is the current voltage of the gate of the driving thin film transistor, and Vth is a threshold voltage of the driving thin film transistor, wherein the acquiring each of the currents flowing through each of the organic light emitting diodes according to the video signal comprises:

acquiring a histogram of the video signal to obtain gray level distribution information of a display image; and acquiring each of the currents flowing through each of the organic light emitting diodes according to the gray level distribution information, wherein the calculating the equivalent voltage according to each of the currents flowing through each of the organic light emitting diodes comprises:

acquiring each equivalent resistance of the pixels between the cathode and the input of the negative voltage of the power source; and acquiring the equivalent voltage according to each of the equivalent resistances and each of the currents of the organic light emitting diodes.

2. The method for driving the organic light emitting diode display device of claim 1, wherein Vg':

$$Vg'=Vgs+U2+U3+Vth,$$

Vgs is a voltage difference between the gate of the driving thin film transistor and a source of the driving thin film transistor, U2 is the equivalent voltage, and U3 is the maximum voltage value included in the maximum values of voltages of the organic light emitting diodes.

* * * * *